United States Patent
Kasperchik et al.

(10) Patent No.: US 8,715,812 B2
(45) Date of Patent: May 6, 2014

(54) METALLIC LUSTER PRINTED MEDIUM AND METHOD OF PREPARING SAME

(75) Inventors: Vladek Kasperchik, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 13/251,164

(22) Filed: Sep. 30, 2011

(65) Prior Publication Data

US 2013/0084440 A1    Apr. 4, 2013

(51) Int. Cl.
| | |
|---|---|
| *B32B 3/00* | (2006.01) |
| *B41M 5/52* | (2006.01) |
| *B41M 5/10* | (2006.01) |
| *B44C 5/02* | (2006.01) |
| *B44C 1/10* | (2006.01) |

(52) U.S. Cl.
CPC ........... *B41M 5/5218* (2013.01); *B41M 5/5254* (2013.01); *B41M 5/10* (2013.01); *B44C 5/02* (2013.01); *B44C 1/105* (2013.01); *Y10S 428/9133* (2013.01)
USPC ........... 428/206; 428/207; 428/208; 428/329; 428/913.3

(58) Field of Classification Search
CPC .... B41M 5/5218; B41M 5/5254; B41M 5/10; B44C 5/02; B44C 1/105
USPC ....................... 428/206, 207, 208, 329, 913.3
See application file for complete search history.

(56) References Cited

U.S. PATENT DOCUMENTS

| | | | |
|---|---|---|---|
| 4,358,779 | A | 11/1982 | Hohn et al. |
| 6,691,610 | B1 | 2/2004 | Wilen |
| 7,326,507 | B2 | 2/2008 | Schulze-Hagenest et al. |
| 7,569,255 | B2 * | 8/2009 | Dannhauser et al. ...... 427/407.1 |
| 7,615,111 | B2 | 11/2009 | Oriakhi |
| 2003/0186020 | A1 | 10/2003 | Kasahara |
| 2004/0109958 | A1 | 6/2004 | Nigam et al. |
| 2007/0022901 | A1 | 2/2007 | Kurze et al. |
| 2007/0034112 | A1 | 2/2007 | Mronga et al. |
| 2007/0076069 | A1 | 4/2007 | Edwards et al. |
| 2007/0281177 | A1 | 12/2007 | Haubrich et al. |
| 2009/0053415 | A1 | 2/2009 | Isobe |
| 2009/0169745 | A1 | 7/2009 | Nohr et al. |
| 2009/0214833 | A1 | 8/2009 | Oyanagi et al. |
| 2009/0294080 | A1 | 12/2009 | Honnorat |
| 2010/0005601 | A1 | 1/2010 | Kantor |
| 2010/0151047 | A1 | 6/2010 | Pfaff et al. |
| 2010/0279078 | A1 | 11/2010 | Pan et al. |
| 2012/0062661 | A1* | 3/2012 | Oriakhi et al. ............... 347/85 |
| 2013/0065031 | A1* | 3/2013 | Kasperchik et al. .......... 428/207 |

FOREIGN PATENT DOCUMENTS

| | | |
|---|---|---|
| JP | 2005280093 A | 10/2005 |
| JP | 2001055530 A | 2/2011 |
| WO | 2010028285 A1 | 3/2010 |
| WO | 2010123504 A1 | 10/2010 |

* cited by examiner

*Primary Examiner* — Betelhem Shewareged

(57) ABSTRACT

A printed medium having a metallic luster includes an ink-receiving layer on a substrate and a layer of metal oxide particles disposed on the ink-receiving layer. A portion of the ink-receiving layer corresponding to at least one feature includes a non-particulate, light-absorbing colorant dispersed in the ink-receiving layer. An amount of the non-particulate, light-absorbing colorant in the ink-receiving layer portion is sufficient to render a predetermined hue to the metallic luster of the at least one feature. The metal oxide particles have an average diameter of about 3 nm to about 300 nm. The ink-receiving layer has pores that are smaller than the average diameter of the metal oxide particles.

20 Claims, 1 Drawing Sheet

METALLIC LUSTER PRINTED MEDIUM AND METHOD OF PREPARING SAME

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers are now very common and affordable and allow one to obtain decent print quality. They are used in home printing, office printing and commercial printing. The growth of inkjet printing is the result of a number of factors including reductions in cost of inkjet printers and improvements in print resolution and overall print quality. A continued demand in inkjet printing has resulted in the need to produce images of high quality, high permanence and high durability while maintaining a reasonable cost. Inkjet printing is also a popular method of non-contact printing on a broad selection of substrates to produce images comprising a variety of colors.

As expanded colors have become available, inkjet printers have found a role in producing decorative appearances for printed images for home and office decorative printing as well as commercial decorative printing. One such decorative appearance is metallic appearance or reflectivity. For example, for some users a gold appearance is desirable. However, the hue of gold that is acceptable or desirable differs by culture and geography. For example, people of Ancient Greece preferred the color of an alloy of gold and silver, which exhibited a whitish/greenish coloration and was referred to as "white gold." People of the Far East and Indian Subcontinent prefer their gold to be of reddish hue and achieve it by mixing gold with some amounts of copper (the more copper in the alloy—the more reddish the gold).

Aqueous (water-based) inkjet inks that can yield images that have one or more of various hues of a metallic luster such as gold and copper, for example, are desirable.

BRIEF DESCRIPTION OF THE DRAWINGS

The drawings provided herein are not to scale and are provided for the purpose of facilitating the understanding of certain examples in accordance with the principles described herein and are provided by way of illustration and not limitation on the scope of the appended claims.

DETAILED DESCRIPTION

Figure 1:
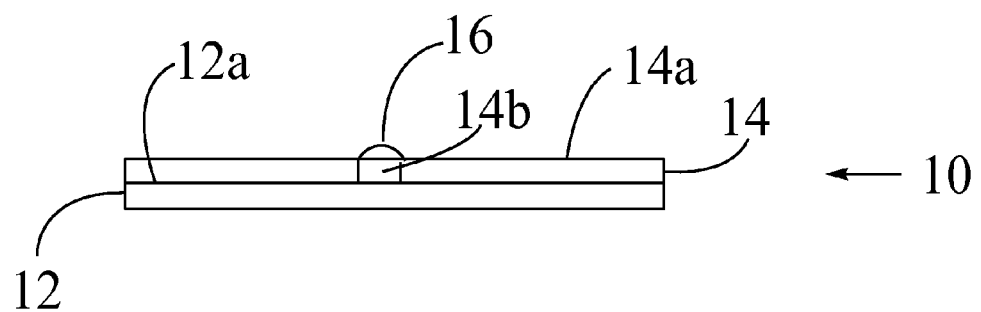
FIG. 1 illustrates in macroscale a schematic of a printed medium according to an example in accordance with the principles described herein.

Examples in accordance with the principles described herein provide aqueous inkjet ink compositions and printed media that exhibit a metallic luster having a targeted hue. In addition, examples in accordance with the principles described herein allow the tuning of the hue of a metallic luster that is produced by an inkjet ink. In accordance with the principles described herein, print media can be printed with ink compositions to achieve one or more features with a visual appearance of different alloys of a metal. The hue of the metallic luster can be altered by addition of a sufficient amount of a non-particulate, light-absorbing colorant to an ink composition comprising a particulate metal oxide. Examples of ink compositions in accordance with the principles described herein can be used as metallic spot color inks to form one or more features mentioned above.

The phrase "metallic luster" refers to an opaque or a semi-opaque appearance such that incident light is reflected directionally in a manner similar to that of a metallic surface. In a feature of a printed article, a metallic luster interacts with light and has a shiny metallic appearance. The feature of the printed article has specific optical properties such as, for example, exhibiting a glow from reflected light and having the tendency to reflect light at a specular angle when the feature is exposed to a directional light source. In some examples, the feature of the printed medium exhibits a gold-like appearance. The phrase "gold-like appearance" means the printed feature has a visual appearance of a gold-plated surface and has the color of metallic gold and presents a gloss, sheen and color as a gold object does.

The phrase "hue of a metallic luster" refers to the shade or degree of a metallic color, which may be, for example, gold color, copper color, or silver color. In one example, for a gold color the hue may be that of pure gold or of gold alloys such as, for example, white gold, red gold, yellow gold, or green gold, by way of illustration and not limitation.

Some examples in accordance with the principles described herein are directed to ink compositions for imparting a metallic luster with a desired hue to a print medium and to a printed medium exhibiting at least one feature having such a metallic luster. The printed medium comprises a print medium substrate having an ink-receiving layer and a layer of metal oxide particles disposed on the ink-receiving layer at the at least one feature. A portion of the ink-receiving layer corresponding to the at least one feature comprises a non-particulate, light-absorbing colorant dispersed in the ink-receiving layer wherein the amount of the non-particulate, light-absorbing colorant in the portion of the ink-receiving layer is sufficient to render a predetermined hue to the metallic luster of the at least one feature. The metal oxide particles have an average diameter of about 3 nm to about 300 nm (nanoparticle range) and the ink-receiving layer has pores that are smaller than the average diameter of the metal oxide particles. Retention of the metal oxide particles at one or more features on the surface of a print medium results in a metal oxide coating on the surface of the print medium at the one or more features.

In some examples in accordance with the principles described herein, the one or more features of the printed medium are obtained by dispensing an ink composition to the surface of a print medium that comprises an ink-receiving layer on one or both sides of a print medium substrate. The ink-receiving layer may be an integral part of the print medium substrate or the ink-receiving layer may be a separate layer associated with one or more surfaces of a print medium substrate. The phrase "associated with" refers to the attachment of the ink-receiving layer to the print medium substrate.

The print medium substrate comprises a material that serves as a base for a separate ink-receiving layer when the print medium substrate does not have the ability to act as an ink-receiving layer. The print medium substrate provides integrity for the resultant print medium. A print medium substrate that has an integral ink-receiving layer should have one or both of good affinity and good compatibility for the ink that is applied to the material. Examples of print medium substrates include, but are not limited to, natural cellulosic material, synthetic cellulosic material (such as, for example, cellulose diacetate, cellulose triacetate, cellulose propionate, cellulose butyrate, cellulose acetate butyrate and nitrocellulose), material comprising one or more polymers such as, for example, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above, for example. In an example the print medium is photoglossy media. In some examples the print medium substrate comprises a paper base including, for example, paper, cardboard, paperboard, foam board, paper laminated with plastics, paper coated with resin and textiles, for example.

The print medium substrate may be planar or such other shape that is suitable for the particular purpose for which it is employed. The print medium substrate may be one or more of smooth or rough, textured or non-textured, rigid, semi-rigid, or flexible, for example. The print medium substrate may have a surface that is porous or non-porous. For non-porous surfaces the print medium substrate will have a porous ink-receiving layer. Planar substrates may be in the form, for example, of a film, plate, board, or sheet by way of illustration and not limitation.

In some examples in accordance with the principles described herein, the print medium substrate has a thickness of about 0.025 mm to about 10 mm, or about 0.05 mm to about 10 mm, or about 0.1 mm to about 10 mm, or about 0.1 mm to about 5 mm, or about 0.1 mm to about 1 mm, or about 0.1 mm to about 0.6 mm, or about 0.5 mm to about 10 mm, or about 0.5 mm to about 5 mm, or about 0.5 mm to about 1 mm, or about 0.5 mm to about 0.6 mm, or about 1 mm to about 10 mm, or about 1 mm to about 5 mm, or about 1 mm to about 2 mm, for example. The basis weight of the print medium substrate is dependent on the nature of the application of the print medium where lighter weights are employed for magazines and tri-folds and heavier weights are employed for post cards, for example.

An ink-receiving layer as a separate layer is able to absorb liquid applied to it and is in that sense porous. The ink-receiving layer may be comprised of one or both of an inorganic material and an organic material. Examples of inorganic materials include, but are not limited to, metal oxides or semi-metal oxides such as, for example, silica, alumina, hydrous alumina (for example, boehmite and pseudo-boehmite), calcium carbonate, silicates (for example, aluminum silicate and magnesium silicate), titania, zirconia, calcium carbonate, and clays, and combinations thereof. Examples of organic materials include, but are not limited to, organic polymeric compositions comprising one or more polymers such as, for example, polyolefins, polyesters, polyamides, ethylene copolymers, polycarbonates, polyurethanes, polyalkylene oxides, polyester amides, polyalkyloxazolines, polyphenyl oxazolines, polyethylene-imines, polyvinyl pyrrolidones, and combinations of two or more of the above.

In some examples, the ink-receiving layer includes treated or modified silica or treated or modified fumed silica. In some examples, the silica or fumed silica is treated with an inorganic treating agent and a monoaminoorganosilane treating agent. In some examples, a porous ink receiving layer includes a combination of boehmite and a binder material such as, for example, an organic polymeric composition as discussed above. In some examples, the ink-receiving layer comprises modified or unmodified alumina. In some examples, the alumina coating can comprise pseudo-boehmite.

In some examples, the porous ink-receiving layer has a coatweight ranging from about 2 grams per square meter (gsm) to about 80 gsm, or from about 10 gsm to about 75 gsm, or about 10 gsm to about 50 gsm. In some examples, the ink-receiving layer has an absorption capacity ranging from about 0.6 to about 1.2 liter/gram (L/g), or about 0.6 L/g to about 1.0 L/g, or about 0.6 L/g to about 0.8 L/g, or about 0.8 L/g to about 1.2 L/g, or about 0.8 L/g to about 1.0 L/g.

In some examples, the porous ink-receiving layer is associated with a print medium substrate by a deposition process including, but not limited to, roll-coating, slot-die processing, blade coating, slot-die cascade coating, curtain coating, spray-coating, immersion-coating, and cast-coating, for example.

The term "porous" refers to the ability of the ink-receiving layer, whether integral to the print medium substrate or a separate layer, to absorb liquid such as, for example, an aqueous ink vehicle by capillary action. The pore size of the ink-receiving layer is smaller than that of the average diameter of the metal oxide particles. The term "smaller" means that the average pore size of the ink-receiving layer is at least equal to, or about 1% smaller, or about 2% smaller, or about 3% smaller, or about 4% smaller, or about 5% smaller than the average diameter of the metal oxide particles. In some examples, the ink-receiving layer is a porous layer having pore diameters in the range of about 1 to about 150 nm, or about 1 nm to about 100 nm, or about 1 nm to about 50 nm, or about 5 to about 150 nm, or about 5 nm to about 100 nm, or about 5 nm to about 50 nm, or about 10 to about 150 nm, or about 10 nm to about 100 nm, or about 10 nm to about 50 nm, for example.

In some examples, the print medium substrate is a photobase, which is a substrate used in coated inkjet photographic papers. Photobase includes a paper base extruded on one or both sides with polymers, such as polyethylene and polypropylene. Photobase support can include a photobase material including a highly sized paper extruded with a layer of polyethylene on both sides. In this regard, the photobase support is an opaque water-resistant material exhibiting qualities of silver halide paper. The photobase support can include a polyethylene layer having a thickness of about 10 to 24 gsm. The photobase support can also be made of transparent or opaque photographic material.

In some examples, the print medium includes a glossy porous protective layer, which may be associated with the outer surface of the ink-receiving layer. In some examples, the glossy protective layer is a porous layer having average pore diameters that are smaller than the size of the metal oxide particles of the ink composition to be applied to form a printed feature. In some other examples, the glossy protective layer is a porous layer having pore diameters in the range of those set forth above for the ink-receiving layer. The coat weight of the glossy protective layer can be from about 0.1 gsm to about 2 gsm or from about 0.25 gsm to about 1 gsm.

The glossy protective layer can contain inorganic colloidal particles such as colloidal particulates of metal oxides and semi-metal oxides or colloidal silica particles and water-soluble binders, such as polyvinylalcohol or copolymers of vinylpyrrolidone. The particle size, as measured by diameter, of the inorganic colloidal particles can be, but is not limited to, about 5 nm to about 150 nm, or about 20 nm to about 100 nm. The inorganic colloidal particles suitable for the glossy protective layer are discrete, single particles and are not aggregates of primary particles. Inorganic colloidal particles can be selected from the group consisting of silica, aluminum, clay, kaolin, calcium carbonate, talc, titanium dioxide and zeolites. In some examples, the inorganic colloidal particles are colloidal silica particles. In some other examples, the porosity of the glossy porous layer is less than about 0.2 L/g. The glossy layer can contain binders. Such binders can be polyvinylalcohol or copolymer of vinylpyrrolidone. The weight percentage of binder, based on the total dry weight of inorganic colloidal particles, can range from about 5% to about 12% or from about 5% to about 10%, or from about 7% to about 12%, for example.

In some examples in accordance with the principles described herein, the ink composition consists essentially of an aqueous ink vehicle, metal oxide particles having an average diameter of about 3 nm to about 300 nm, a non-particulate, light-absorbing colorant dissolved in the ink vehicle wherein the amount of the non-particulate, light-absorbing colorant in the ink vehicle is sufficient to render a predetermined hue to the metallic luster of the ink composition when applied to a print medium, and a dispersant.

The phrase "ink vehicle" refers to any liquid that is used to carry one or both of pigments and colorants to a printing medium. A wide variety of liquid vehicle components may be used. In some examples, by way of illustration and not limitation, the ink vehicle comprises water and may comprise one or more other liquid vehicle components. In some examples, the ink vehicle may include a polar organic solvent and one or more of a variety of different agents for affecting various properties of the ink composition. The amount of water in the ink composition is dependent, for example, on the amount of other components of the ink composition. In some examples, the amount of water in the ink composition by weight is in the range of about 40% to about 90%, or about 50% to about 90%, or about 60% to about 90%, or about 60% to about 80%, or about 60% to about 70%, or about 65% to about 85%, or about 65% to about 75%, or about 65% to about 70%, for example, with the remaining percentage being the other components of the ink composition.

Examples of water-soluble polar organic solvents that may be included in the ink vehicle are, but are not limited to, alcohols, polyhydric alcohols, ketones, keto-alcohols, ethers, esters, glycols, amines, lactams, ureas, amides, sulfoxides, sulfolanes, nitriles, and pyrrolidones, for example, and combinations of two or more of the above. An amount of the organic solvent in the ink composition is dependent on one or more of the nature of the metal oxide, the nature of the non-particulate, and the nature of the light-absorbing colorant, for example. In some examples, the amount of organic solvent in the ink composition is about 1% to about 30%, or about 1% to about 20%, or about 1% to about 10%, or about 1% to about 5%, or about 5% to about 30%, or about 5% to about 20%, or about 5% to about 10%, or about 10% to about 30%, or about 10% to about 20%, by weight of the ink composition, for example.

As mentioned above, in some examples the ink vehicle may include one or more of a variety of different agents or additives for affecting various properties of the ink composition. The additives include, but are not limited to, one or more of surfactants or wetting agents (e.g., surfactants containing silicone compounds or fluorinated compounds), rheology modifiers, buffers, biocides, viscosity modifiers, sequestering agents, slip components, leveling agents, preservatives, anti-molding agents, anti-foaming agents, polymeric binders, and stabilizers such as, e.g., storage stability enhancing agents, for example. The total amount by weight of additives in the ink composition is about 0.1% to about 1%, or about 0.1% to about 0.5%, or about 0.1% to about 0.2%, or about 0.2% to about 1%, or about 0.2% to about 0.5%, or about 0.5% to about 1%, for example.

The pH of the ink composition may be in the range of about 3 to about 11 or about 5 to about 9 or about 5.5 to about 8.5, for example. The pH of the ink composition may be adjusted by addition of a pH adjusting agent such as, for example, an organic or inorganic acid or base. The ink composition can have a viscosity within the range of about 1.0 to about 10 centipoise (cps), or within the range of about of about 1.0 to about 7.0 cps, as measured at 25° C.

The phrase "predetermined hue" refers to a visual appearance of a metallic luster that is similar to a metal or a metal alloy and that is acceptable to a certain culture or a certain geographical area.

The phrase "metal oxide" refers to an oxide of a metal such as, but not limited to, iron, copper, aluminum, titanium, zinc, magnesium, and indium, for example, and combinations of two or more of the above. The amount of metal oxide in the ink composition is that which is sufficient to achieve the desired metallic luster and depends on one or more of the nature of the metal oxide, and the nature of the metallic luster, for example. In some examples, the amount by weight of metal oxide in the ink composition may be about 0.1% to about 15%, or about 0.1% to about 10%, or about 0.1% to about 5%, or about 0.1% to about 1%, or about 0.5% to about 15%, or about 0.5% to about 10%, or about 0.5% to about 5%, or about 0.5% to about 1%, or about 1% to about 15%, or about 1% to about 10%, or about 1% to about 5%, or about 1% to about 2%, for example.

In some examples in accordance with the principles described herein, the metal oxide is an iron oxide, which is a chemical compound composed of iron and oxygen. The term iron oxide encompasses iron oxides, iron hydroxides or iron oxide/hydroxides. Examples of iron oxides include, but are not limited to, iron (II) oxide (wüstite, FeO), iron (II, III) oxide (magnetite, $Fe_3O_4$) and iron (III) oxide (hematite, $Fe_2O_3$) and combinations of two or more of the above. Examples of iron hydroxides include iron (II) hydroxide (Fe $(OH)_2$) and iron (III) hydroxide ($Fe(OH)_3$) and combinations of two or more of the above.

As mentioned above, the average particle size or diameter of the metal oxide particles is in the range of about 3 nm to about 300 nm. In some examples, the average particle size or diameter of the metal oxide particles is in the range of about 3 nm to about 200 nm, or about 3 nm to about 150 nm, or about 3 nm to about 100 nm, or about 3 nm to about 80 nm, or about 3 nm to about 60 nm, or about 3 nm to about 40 nm, or about 3 nm to about 30 nm, or about 3 nm to about 20 nm, or about 3 nm to about 10 nm, or about 5 nm to about 150 nm, or about 5 nm to about 100 nm, or about 5 nm to about 80 nm, or about 5 nm to about 60 nm, or about 5 nm to about 40 nm, or about 5 nm to about 30 nm, or about 5 nm to about 20 nm, or about 5 nm to about 10 nm, or about 10 nm to about 100 nm, or about 10 nm to about 80 nm, or about 10 nm to about 60 nm, or about 10 nm to about 40 nm, or about 10 nm to about 30 nm, or about 10 nm to about 20 nm, or about 20 nm to about 100 nm, or about 20 nm to about 80 nm, or about 20 nm to about 60 nm, or about 20 nm to about 40 nm, or about 20 nm to about 30 nm, for example.

The metal oxide such as, for example, iron oxide (e.g., $Fe_3O_4$) may be prepared as a dispersion for addition to an ink vehicle to form the ink composition. The metal oxide dispersion may be prepared by milling commercially available inorganic oxide pigment having large particle size (in the micron range) in the presence of one or more dispersants until the desired particle size is achieved. The starting dispersion to be milled is an aqueous dispersion with solids content up to 40% by weight of the metal oxide pigment. An example of a milling device that can be used is a bead mill, which is a wet grinding machine capable of using very fine beads having diameters of less than 1.0 mm as a grinding medium. Conditions for the milling operation such as, for example, the amount of metal oxide particles, the amount of dispersant, the milling duration, the rotor speed and the temperature, for example, are chosen based on one or more of the nature of the metal oxide particles, the nature of the dispersant, the targeted average particle size of the metal oxide particles in the resulting dispersion, and the nature of the milling apparatus.

The non-particulate, light-absorbing colorant is a water soluble dye compound that provides a color. The phrase "non-particulate" means that the compound forms a molecular solution (that is, the colorant is soluble) in the ink vehicle and passes into, and is absorbed by, the ink-receiving layer with little or no retention on the surface of the ink-receiving layer as distinguished from a pigment, which has a particulate nature and is subject to retention at the surface of the ink-receiving layer. The phrase "light-absorbing" refers to the ability of the compound to absorb light rather than reflect or transmit light. The light absorbing compound has little, if any, significant negative impact on directional surface (metallic) reflectivity of a printed medium. The nature and the amount of the non-particulate, light-absorbing colorant in the ink vehicle is sufficient to render a predetermined hue to the metallic luster of the ink composition when the ink composition is applied to a print medium.

The nature of the colorant is dependent on one or more of the nature of the metal oxide, the nature of the ink-receiving layer, and the targeted hue (e.g., a hue of gold luster, white gold, yellow gold, red gold, or green gold), for example. In some examples, the colorant absorbs light in the visible range or in the range of about 400 nm to about 700 nm. The color of the colorant compound may be, but is not limited to, yellow, cyan, magenta, green, red, black, and orange, for example, and combinations of two or more of the above. Examples of yellow dyes include, but are not limited to, AY17, AY23, RY181, DY86, and DY132, for example, and combinations of two or more of the above. Examples of cyan dyes include, but are not limited to, Cyan Dye 1 (HCE®, Nippon Kayaku Co. Ltd., Tokyo, Japan), DB 199, AB9, C485, and C854, for example, and combinations of two or more of the above. Examples of magenta dyes include, but are not limited to, AR52, AR249, AR289, DR23, DR75, DR227, RR120, pacified RR120, RR180, pacified RR180, RR23, and RR24, for example, and combinations of two or more of the above. Examples of green dyes include, but are not limited to, AG1, AG41, and BG4, for example, and combinations of two or more of the above. Other dye colors such as, for example, red dyes and orange dyes, are produced by mixing appropriate quantities of one or more of a magenta dye, a cyan dye and a yellow dye.

The amount of the colorant in the ink composition is dependent on one or more of the nature and amount of the metal oxide, the nature of the ink-receiving layer, and the targeted hue, for example. In some examples, the amount by weight of the colorant in the ink composition is about 0.001% to about 2%, or about 0.001% to about 1.5%, or about 0.001% to about 1%, or about 0.001% to about 0.5%, or about 0.001% to about 0.1%, or about 0.001% to about 0.01%, or about 0.01% to about 2%, or about 0.01% to about 1.5%, or about 0.01% to about 1%, or about 0.01% to about 0.5%, or about 0.1% to about 2%, or about 0.1% to about 1.5%, or about 0.1% to about 1%, or about 0.1% to about 0.5%, or about 0.5% to about 2%, or about 0.5% to about 1.5%, or about 0.5% to about 1%, for example.

An example in accordance with the principles described herein is set forth in FIG. 1. Printed medium 10 comprises a print medium substrate 12 having an ink-receiving layer 14 on a surface 12a of the print medium substrate 12. A feature 16 comprising metal oxide particles is disposed on a surface 14a of the ink-receiving layer 14. The ink-receiving layer 14 has a colorant absorbed at an area 14b of the ink-receiving layer 14 in an area that lies substantially directly below the feature 16.

Adjusting the amount of the non-particulate light-absorbing colorant in the ink composition allows for controlling the hue of an ink composition having a metallic luster when the ink composition is applied to a print medium. In this manner the hue of the metallic luster can be tuned to a desired color. In some examples an ink composition as described above may be applied to a print medium to form at least one feature having a metallic luster with a predetermined hue. In some examples, the amount by weight of the non-particulate, light-absorbing colorant at the at least one feature is about 0.001% to about 2%, or about 0.001% to about 1.5%, or about 0.001% to about 1%, or about 0.001% to about 0.5%, or about 0.001% to about 0.1%, or about 0.001% to about 0.01%, or about 0.01% to about 2%, or about 0.01% to about 1.5%, or about 0.01% to about 1%, or about 0.01% to about 0.5%, or about 0.1% to about 2%, or about 0.1% to about 1.5%, or about 0.1% to about 1%, or about 0.1% to about 0.5%, or about 0.5% to about 2%, or about 0.5% to about 1.5%, or about 0.5% to about 1%, for example.

In some examples, the ink composition also comprises a dispersant in an amount sufficient to achieve a predetermined jetting reliability for the ink composition. Examples of suitable dispersants include, but are not limited to, water-soluble anionic species of low and high molecular weight such as phosphates and polyphosphates, phosphonates and polyphosphonates, phosphinates and polyphosphinates, carboxylates (for example, citric acid or oleic acid), polycarboxylates (for example, acrylates and methacrylates), hydrolysable alkoxysilanes with alkoxy group attached to water-soluble (hydrophilic) moieties such as water-soluble polyether oligomer chains (for example, polyether alkoxysilanes, including, e.g., SILQUEST®A-1230 (Momentive Performance Materials Inc., Columbus Ohio), and DYNASYLAN® 4144 (Evonik/Degussa Corporation, Parsippany N.J.), for example.

The amount of the dispersant in the ink composition is dependent on one or more of the nature of the dispersant, the nature and the amount of the metal oxide, the nature of the ink-receiving layer, and the nature of the jetting instrument, for example. In some examples, the amount by weight of dispersant in the ink composition may vary from about 1% to about 300%, or about 2% to about 150%, or about 5% to about 100% of the metal oxide particles content.

In some examples, the ink composition used to form the printed feature on the printed medium contains magnetite ($Fe_3O_4$) as the iron oxide pigment. The ink composition can contain stable colloidal dispersions of inorganic iron oxide particles, such as one or both of magnetite ($Fe_3O_4$) and hematite ($Fe_2O_3$). In some other examples, the ink composition contains an ink vehicle and a colloid dispersion of iron oxide particles that form an iron oxide coating at one or more features on a printed medium. The average particle size of iron oxides is in the range as set forth above for the metal oxide. In some examples, the average particle size for the iron oxide particles is in the range of about 3 nm to about 300 nm. In some examples, the average particle size of iron oxide is in the range of about 5 nm to about 200 nm and in some other examples, in the range of about 10 nm to about 100 nm.

Surfactants present in the ink composition may include, for example, anionic surfactants such as, for example, sodium dodecylsulfate, sodium dodecyloxysulfonate and sodium alkylbenzenesulfonate; cationic surfactants such as, for example, cetylpyridinium chloride, trimethylcetylammonium chloride and tetrabutylammonium chloride; and non-ionic surfactants such as, for example, polyoxyethylene nonylphenyl ether, polyoxyethylene naphthyl ether and polyoxyethylene octylphenyl ether. Other surfactants include, but are not limited to, amphoteric surfactants, silicon-free surfactants, ethoxylated surfactants, fluorosurfactants, alkyl polyethylene oxides, alkyl phenyl polyethylene oxides, polyethylene oxide block copolymers, and polysiloxanes, for example, and combinations thereof.

Examples of suitable biocides that may be present in the ink composition include, but are not limited to, benzoate salts, sorbate salts, commercial products such as NUOSEPT® (Ashland Special Ingredients, Wayne N.J.), UCARCIDE® (Dow Chemical Company, Midland Mich.), VANCIDE® (R.T. Vanderbilt Company, Inc., Norwalk Conn.), PROXEL® (Avecia OligoMedicines, Inc., Milford Mass.), and KORDEK® MLX (Dow Chemical Company), for example.

Specific examples of commercially available anti-foaming agents that may be present in the ink composition include, but are not limited to, FOAMEX® 800, FOAMEX® 805, FOAMEX® 845, FOAMEX® 842, FOAMEX® 835, (all available from Evonik Tego Chemie Service GmbH, Essen, Germany) and TWINED 4000 (Evonik Tego Chemie Service GmbH); BYK® 019, BYK® 028, BYK® 029 (available from BYK Chemie GmbH, Wesel, Germany); and SURFYNOL® 104PG50, SURFYNOL® MD30 (all available from Air Products and Chemicals, Inc., Allentown Pa.), for example.

In some examples, the ink composition may be prepared by combining the metal oxide particles, the non-particulate, light-absorbing colorant and other additives in a suitable aqueous ink vehicle. The combination is subjected to conditions under which the ink composition becomes substantially uniform and then the combination is subjected to filtration to remove any large particles that may prohibit reliable jetting.

In some examples, conditions for rendering the ink composition to a substantially uniform dispersion include, for example, agitation such as, e.g., one or more of mixing, stirring, shaking, homogenizing, sonication, ultrasonication, microfluidization, bead milling, and blending, for example, or a combination of the above. In some examples, the temperature during the above procedure may be, for example, about 10° C. to about 40° C. In some examples the temperature is ambient temperature. The duration of the above treatment may be, for example, about 0.5 hours to about 5 hours. The phrase "substantially uniform" means that there is no visible phase separation.

Filtration of the ink composition may be carried out using, by way of illustration and not limitation, one or more of membrane filtration, surface filtration, depth filtration, screen filtration, and filtration aid, for example. The pore size of the filtration substrate should be large enough to allow the metal oxide particles to pass through the substrate, but small enough to retain larger particles.

In some examples in accordance with the principles described herein, the ink compositions find use as inkjet inks for inkjet printers. In some examples, the ink compositions may be dispensed to the surface of a broad range of print media employing inkjet technology and equipment. This technology is a non-impact printing method in which an electronic signal controls and directs droplets or a stream of ink that can be deposited on a wide variety of print media. Current inkjet printing technology involves forcing the ink drops through small nozzles by thermal ejection, piezoelectric pressure or oscillation, onto the surface of a media.

For inkjet printing, the ink composition may be heated or chilled to an appropriate dispensation temperature prior to ejecting the ink composition to the surface of a substrate. The particular temperature and viscosity of the ink composition is dependent on, for example, the particular method and equipment for conducting the ink jet printing. Considerations regarding temperature and viscosity of the ink composition relate to the effect on droplet size and droplet ejecting rate, for example. In some examples a jetting temperature is about 1° C. to about 90° C., or about 25° C. to about 80° C., or about 5° C. to about 15° C., for example. In some examples the temperature is maintained relatively constant, which means that the temperature variation is controlled so that there is no more than a variation of ±1° C., or ±0.5° C., or ±0.2° C., or ±0.1° C., for example. Temperature control is achieved with appropriate temperature sensors, for example. In some examples, the temperature of a print medium during the printing process may be in the range of about 25° C. to about 90° C., for example.

In some examples, ink compositions in accordance with the principles described herein may be dispensed from any piezoelectric, drop-on-demand inkjet printing devices and many such devices are commercially available. Such inkjet printing devices are available from Hewlett-Packard, Inc., Palo Alto, Calif., by way of illustration and not limitation. In inkjet printing devices for ink jet printing, liquid ink drops are applied in a controlled fashion to a print medium by ejecting ink droplets from a plurality of nozzles, or orifices, in a print head of an ink jet printing device or inkjet printer. In drop-on-demand systems, a droplet of ink is ejected from an orifice directly to a position on the surface of a print medium by pressure created by, for example, a piezoelectric device, an acoustic device, or a thermal process controlled in accordance digital data signals. An ink droplet is not generated and ejected through the orifices of the print head unless it is needed. The volume of the ejected ink drop is controlled mainly with a print head.

The printed or jetted ink may be dried after jetting the ink composition in a predetermined pattern onto a surface of a print medium. The drying stage may be conducted, by way of illustration and not limitation, by hot air, electrical heater or light irradiation (e.g., IR lamps), or a combination of such drying methods. In order to achieve best performance it is advisable to dry the ink at a maximum temperature allowable by the print medium that enables good image quality without print medium deformation. In some examples, a temperature during drying is about 40° C. to about 150° C., for example.

In some examples, a printed feature of the printed medium may have a thickness that is between about 40 nm and about 600 nm or between about 50 and about 400 nm. In some examples, a printed feature has a density, or a metal or metal oxide particles coverage, in the range about 3 to about 80 µg/cm$^2$ and in some other examples, has a density in the range of about 4 to about 60 µg/cm$^2$.

Figure 2:
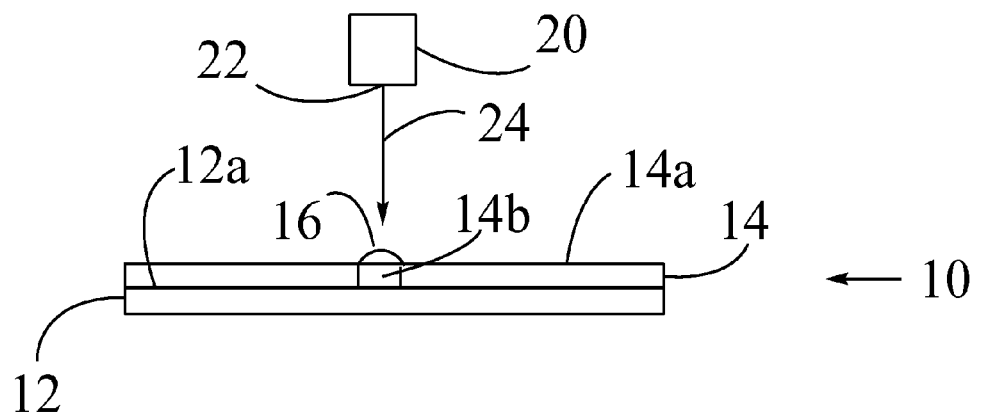
FIG. 2 is schematic of the formation of the printed medium of FIG. 1 according to an example in accordance with the principles described herein.

An example of forming a printed medium having at least one feature that exhibits a metallic luster having a predetermined hue is shown in FIG. 2. Printer 20 has an orifice 22 that dispenses droplets of an ink composition in accordance with the principles described herein along a trajectory 24 to a surface 14a of an ink-receiving layer 14 to form a feature 16, which is comprised of metal oxide particles that are retained on the surface 14a at the feature 16. An ink vehicle of the ink composition having a soluble colorant for obtaining a predetermined hue of the metallic luster passes into the ink-receiving layer 14 to form an area 14b, which is adjacent and corresponds to the feature 16 in the ink-receiving layer 14. The area 14b has colorant absorbed therein below the feature 16.

Examples of printed medium in accordance with the principles described herein may have, by way of illustration and not limitation, decorative applications, such as greeting cards, scrapbooks, brochures, book covers, signboards, business cards, and certificates, for example.

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 20%, or plus or minus 15%, or plus or minus 10%, or plus or minus 5%, or plus or minus 1%, for example. The term "between" when used in conjunction with two numbers such as, for example, "between about 2 and about 50" includes both of the numbers recited.

Numerical values, such as ratios, amounts, temperatures and time periods, for example, may be presented herein in a range format. It is to be understood that such range format is used merely for convenience and brevity and should be interpreted to include not only the numerical values explicitly recited as the limits of the range, but also to include all the individual numerical values or sub-ranges encompassed within that range as if each numerical value and sub-range is explicitly recited.

As used herein, the singular forms "a", "an" and "the" include plural referents unless the content clearly dictates otherwise. In some instances, "a" or "an" as used herein means "at least one" or "one or more." Designations such as "first" and "second" are used solely for the purpose of differentiating between two items and are not meant to imply any sequence or order or importance to one item over another or any order of operation, for example.

EXAMPLES

The following examples are by way of illustration and not limitation on the scope of the principles described herein and the appended claims. Numerous modifications and alternative compositions, methods, and systems may be devised without departing from the spirit and scope of the present disclosure. Unless otherwise indicated, materials in the experiments below may be purchased from Aldrich Chemical Company, St. Louis Mo. Parts and percentages are by weight unless indicated otherwise.

Example 1

Ink compositions are prepared based on dispersions containing $Fe_3O_4$ nanoparticles. The dispersion is produced by milling nanoparticle $Fe_3O_4$ powder (Inframat Advanced Materials, Manchester Conn.) in a ULTRA APEX MILL® UAM-015 (Kotobuki Industries Co., LTD, Kure, Japan) with a dispersant, namely, SILQUEST®A-1230 (Momentive Performance Materials, Columbus Ohio) at a dispersant/metal oxide particles ratio equal to 0.5. The resulting dispersion contains about 5.5% of $Fe_3O_4$ particles. The average particle size of the $Fe_3O_4$ particles is about 32 nm as measured by a NANOTRAC® particle size analyzer (Microtrac Corp., Montgomeryville Pa.). The dispersion is then used to produce the ink compositions summarized in Table 1. LEG-1 is liponic branched ethylene glycol (available from Liponics Technologies, West Sacramento Calif.). PROXEL®GXL is a biocide (available from Arch Chemicals, Norwalk Conn.). SURFYNOL®465 is a surfactant from Air Products and Chemicals, Inc., Allentown Pa. Acid Yellow 17 (AY 17), and Acid Red 52 (AR 52) are from Sensient Technologies, Carlsbad Calif., and Cyan Dye 1 (HCE®) is from Nippon Kayaku Co. Ltd., Tokyo, Japan.

The ink compositions are printed on a print medium that is porous glossy inkjet paper HP Advanced Photo Paper (Hewlett Packard, Palo Alto Calif.). The printer used is a HP PHOTOSMART® 8450 (Hewlett Packard, Palo Alto Calif.). One hour after printing, the printed articles are subjected to color measurements based on a CIELAB® color space system with SPECTROEYE™ (Gretag-Macbeth AG, New Windsor N.Y.). Impact of the dye addition on color of the resulting metallic article (printed at ink flux of about 68 picoliters (pL)/$300^{th}$ pixel) is summarized in Table 2. The print samples produced with inks having soluble dyes added to $Fe_3O_4$ pigment (2a-c, 3a-c, 4a-c) have visual metallic appearance similar to that of the print produced with Control (1, $Fe_3O_4$-only) ink but of different color hues as it is evident from the data in the Table 2. L*, a* and b* are as defined in CIELAB®, which is color space specified by the International Commission on Illumination.

TABLE 1

| Formulation # | 1 Control | 2(a-c) AY 17 | 3(a-c) AR 52 | 4(a-c) Cyan Dye 1 |
|---|---|---|---|---|
| $Fe_3O_4$ Dispersion | 36.20 | 36.20 | 36.20 | 36.20 |
| LEG-1 | 5.00 | 5.00 | 5.00 | 5.00 |
| 2-Pyrrolidinone | 9.00 | 9.00 | 9.00 | 9.00 |
| TRIZMA ® Base | 0.20 | 0.20 | 0.20 | 0.20 |
| PROXEL ® GXL | 0.10 | 0.10 | 0.10 | 0.10 |
| SURFYNOL ® 465 | 0.20 | 0.20 | 0.20 | 0.20 |
| Acid Yellow 17 (AY 17) | | (2a)0.05 (2b)0.13 (2c)0.25 | | |
| Acid Red 52 (AR 52) | | | (3a)0.02 (3b)0.05 (3c)0.10 | |
| Cyan Dye 1 | | | | (4a)0.02 (4b)0.05 (4c)0.10 |
| Water | Up to 100% | Up to 100% | Up to 100% | Up to 100% |

TABLE 2

| Formulation # | 1 Control | 2(a-c) AY 17 | 3(a-c) AR 52 | 4(a-c) Cyan Dye 1 |
|---|---|---|---|---|
| a* | 1.29 | (2a) 0.56 | (3a) 3.36 | (4a) −1.76 |
|  |  | (2b) 0.24 | (3b) 6.66 | (4b) −5.48 |
|  |  | (2c) −0.63 | (3c) 11.79 | (4c) −10.66 |
| b* | 30.85 | (2a) 34.24 | (3a) 31.33 | (4a) 31.59 |
|  |  | (2b) 37.06 | (3b) 30.21 | (4b) 28.57 |
|  |  | (2c) 39.93 | (3c) 28.59 | (4c) 24.01 |
| L* | 76.0 | (2a) 76.0 | (3a) 75.2 | (4a) 74.8 |
|  |  | (2b) 76.0 | (3b) 74.5 | (4b) 73.4 |
|  |  | (2c) 75.8 | (3c) 72.8 | (4c) 71.2 |

It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A printed medium comprising:
   a substrate having an ink-receiving layer, a portion of the ink-receiving layer corresponding to at least one feature having a metallic luster, the at least one feature comprising a non-particulate, light-absorbing colorant dispersed in the ink-receiving layer, an amount by weight of the non-particulate, light-absorbing colorant being about 0.001% to about 2% to render a predetermined hue to the metallic luster of the at least one feature; and
   a layer of metal oxide particles disposed on the ink-receiving layer at the at least one feature, the metal oxide particles having an average diameter of about 3 nm to about 300 nm, wherein the ink-receiving layer has pores that are smaller than the average diameter of the metal oxide particles.

2. The printed medium according to claim 1, wherein the metal oxide particles are iron oxide particles.

3. The printed medium according to claim 1, wherein the metal oxide particles are magnetite particles.

4. The printed medium according to claim 1, wherein the average diameter of the metal oxide particles is about 5 nm to about 150 nm.

5. The printed medium according to claim 1, wherein the metallic luster is gold and the non-particulate, light-absorbing colorant is selected to render a predetermined hue of a gold alloy.

6. The printed medium according to claim 5, wherein the predetermined hue is selected from the group consisting of white gold, yellow gold, red gold, and green gold.

7. The printed medium according to claim 5, wherein the non-particulate, light-absorbing colorant is selected from the group consisting of yellow dyes, cyan dyes, magenta dyes, and combinations of two or more of the above.

8. An ink composition applied to the print medium of claim 1 to form the at least one feature, the ink composition consisting essentially of:
   an aqueous ink vehicle;
   the metal oxide particles;
   the non-particulate, light-absorbing colorant dissolved in the ink vehicle; and
   a dispersant.

9. The ink composition according to claim 8, wherein the metal oxide particles are iron oxide particles.

10. The ink composition according to claim 8, wherein the metal oxide particles are magnetite particles.

11. The ink composition according to claim 8, wherein the average diameter of the metal oxide particles is about 5 nm to about 150 nm.

12. The ink composition according to claim 8, wherein the metallic luster is gold and the non-particulate, light-absorbing colorant is selected to render a predetermined hue of a gold alloy.

13. The ink composition according to claim 8, wherein the predetermined hue is selected from the group consisting of white gold, yellow gold, red gold, and green gold.

14. The ink composition according to claim 8, wherein the non-particulate, light-absorbing colorant is selected from the group consisting of yellow dyes, cyan dyes, magenta dyes, and combinations of two or more of the above.

15. A method of printing a medium having the at least one feature comprising a metallic luster, the method comprising:
   dispensing to a portion of the print medium the ink composition according to claim 8 to create the at least one feature, and wherein the metal oxide particles form a layer on the ink-receiving layer to form the at least one feature, wherein the non-particulate, light-absorbing colorant is dispersed in the ink-receiving layer adjacent to the at least one feature.

16. A method for controlling a hue of an ink composition having a gold luster when applied to a print medium, the method comprising:
   providing a combination consisting essentially of an aqueous ink vehicle, iron oxide particles having an average diameter of about 3 nm to about 300 nm, and a non-particulate, light-absorbing colorant, wherein an amount of the non-particulate, light-absorbing colorant in the ink vehicle is about 0.001% to about 2% to render a predetermined hue to the gold luster of the ink composition, and
   applying the combination to a print medium to form at least one feature, wherein the print medium has an ink-receiving layer that has a pore size that is smaller than the average diameter of the iron oxide particles, the non-particulate, light-absorbing colorant being dispersed in the ink-receiving layer adjacent to the at least one feature.

17. The method according to claim 16, wherein the iron oxide particles are magnetite particles.

18. The method according to claim 16, wherein the average diameter of the iron oxide particles is about 5 nm to about 150 nm.

19. The method according to claim 16, wherein the predetermined hue is selected from the group consisting of white gold, yellow gold, red gold, and green gold.

20. The method according to claim 16, wherein the non-particulate, light-absorbing colorant is selected from the group consisting of yellow dyes, cyan dyes, magenta dyes, and combinations of two or more of the above.

* * * * *